F. LEADBEATER.
COUNTERBALANCE FOR TRACTORS.
APPLICATION FILED JULY 30, 1917.

1,277,434.

Patented Sept. 3, 1918.

Witnesses
Arthur T. Draper
Chas. W. Stauffiger

Inventor
Frederick Leadbeater
By
Attorneys

UNITED STATES PATENT OFFICE.

FREDERICK LEADBEATER, OF DETROIT, MICHIGAN.

COUNTERBALANCE FOR TRACTORS.

1,277,434.      Specification of Letters Patent.      Patented Sept. 3, 1918.

Application filed July 30, 1917. Serial No. 183,570.

*To all whom it may concern:*

Be it known that I, FREDERICK LEADBEATER, a citizen of the United States of America, residing at Detroit, in the county of Wayne and State of Michigan, have invented certain new and useful Improvements in Counterbalances for Tractors, of which the following is a specification, reference being had therein to the accompanying drawings.

In the operation of tractors, particularly of the type wherein road vehicles are converted for such use, the forward portion of the car is frequently too light, causing the machine to rear under heavy load, especially if the traction wheels have good grip on the surface of the ground.

This invention relates to means for holding the forward portion of a tractor and the front wheels thereof on the ground and to an arrangement thereof whereby the weight may be adjusted to accommodate different working conditions and the device itself removed when not in use.

The invention consists in the matters hereinafter set forth, and more particularly pointed out in the appended claims.

Figure 1:
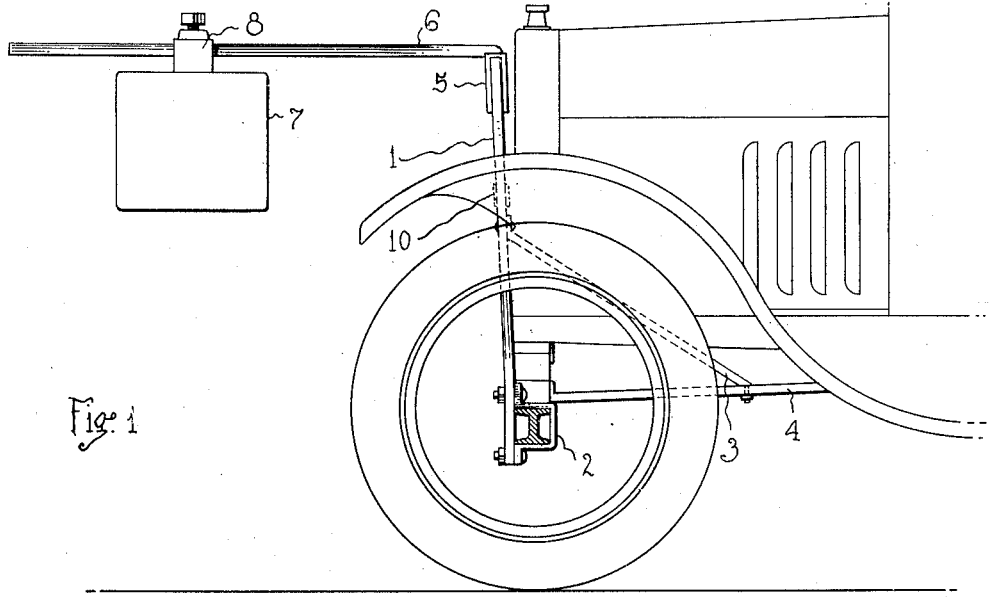
Figure 1 is a view in elevation of a device that embodies the invention applied to the front of an automobile or tractor, the latter being shown partially diagrammatically in elevation and partially in section.
Figure 2:
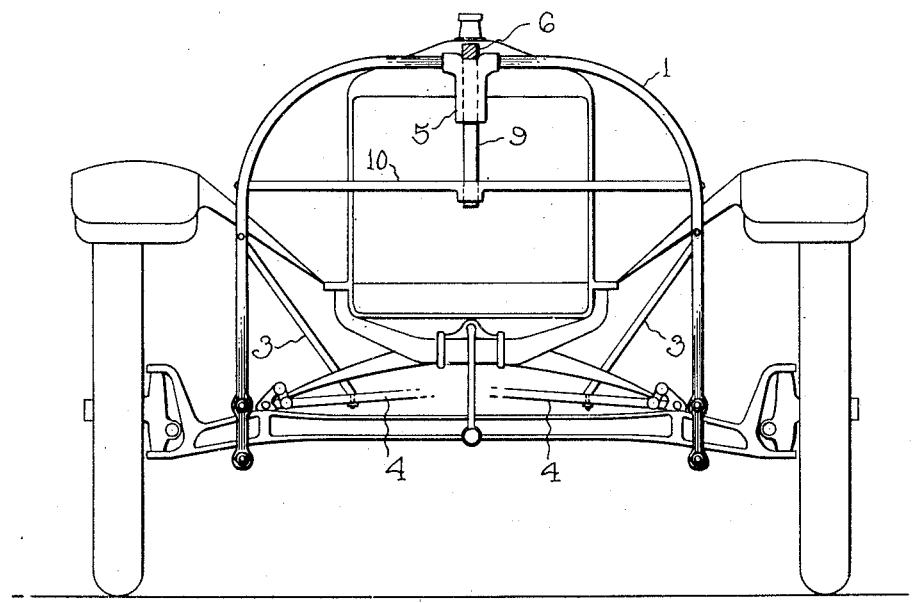
Fig. 2 is a front elevation of the device, partially broken away and in section.

Referring to the drawings an upright frame 1 of suitable proportion to span the forward axle of the machine is secured to the latter detachably as by clips 2 with braces 3 extending rearwardly from the upper part of the frame to axle braces 4 or other parts of the machine which are rigid with the axle. A socket 5 depends from the middle portion of the frame and detachably secures a forwardly extending weight supporting member 6. An adjustable weight 7 with clip 8 is slidably mounted on this guide or support 6. Preferably the depending arm 9 of the member 6 is stepped in a cross brace 10 of the frame.

By means of this arrangement, which is readily mounted on the forward end of a machine, a counterbalance is provided which by movement in and out, can be adjusted to hold the forward bearing wheels of the machine on the ground when the torque imparted to the traction wheel shafts or hubs by the power plant of the machine tends to cause the front portion of the machine to rear upwardly. This occurs when the tractor is under heavy load, or when the moment of the weight centers around the axis or rotation of the traction wheels is exceeded by the resisting torque on the rims of the traction wheels themselves. The weight which may be comparatively light, because of its comparatively long distance from the traction wheel center, greatly increases the resistance of the machine against this uptilting tendency without correspondingly adding to the dead load of the weight of the tractor itself. Thus the advantages of a heavier tractor are obtained without the disadvantages thereof. By removing the weight and the forwardly extending member 6, the latter being readily lifted from its socket the machine can be used without the counterbalance where conditions do not require it.

Obviously, changes in the details of construction may be made without departing from the spirit of my invention, and I do not care to limit myself to any particular form or arrangement of parts.

What I claim is:—

1. The combination with a tractor of a weight, a frame detachably secured to the front axle and a forwardly extending member detachably secured to the frame on which the weight is adjustably mounted.

2. The combination with a tractor having rear traction bearing wheels of a counter weight frame adapted to be secured to the forward axle of the tractor and provided with a forwardly extending weight supporting member and a weight slidably mounted on this support.

3. The combination with a tractor having rear traction wheels and front traction guide wheels of an upright frame, clips detachably securing the frame to the forward axle of the tractor, a socket on the frame, a forwardly extending weight support, detachably secured in the socket and a weight adjustable longitudinally of the support.

4. The combination in an automobile, of a front axle thereof and axle braces, with an upright frame detachably secured to the end portion of the front axle and stayed to the axle braces, a socket on the middle portion of the frame, a forwardly extending weight supporting member mounted in the socket, and a weight slidably mounted on the supporting member.

5. The combination in an automobile, of a front axle and bracing members thereof, of an upright frame detachably secured to the axle and bracing members, a substantially horizontal weight supporting member extending forwardly from the frame, and a weight slidably adjusted on the forwardly extending member.

In testimony whereof I affix my signature in presence of two witnesses.

FREDERICK LEADBEATER.

Witnesses:
ANNA M. DORR,
C. R. STUKUR.